United States Patent [19]

Van Buskirk

[11] 3,770,887

[45] Nov. 6, 1973

[54] COLOR STEREO TELEVISION

[75] Inventor: Lyman F. Van Buskirk, Ridgecrest, Calif.

[73] Assignee: The United States of America as represented by the Secretary of the Navy, Washington, D.C.

[22] Filed: Jan. 31, 1972

[21] Appl. No.: 222,186

[52] U.S. Cl. .......... 178/6.5, 178/5.2 R, 178/5.4 CF, 178/7.86, 178/7.88, 178/7.89

[51] Int. Cl. .......... H04n 9/60

[58] Field of Search .......... 178/6.5, 5.2 R, 5.4 CF, 178/7.86, 7.88, 7.89

[56] References Cited

UNITED STATES PATENTS

| | | | |
|---|---|---|---|
| 2,437,690 | 3/1948 | Goldmark | 178/5.4 CF |
| 3,614,314 | 10/1971 | Rossire | 178/6.5 |
| 2,384,260 | 9/1945 | Goldsmith | 178/6.5 |
| 3,670,097 | 6/1972 | Jones | 178/6.5 |

*Primary Examiner*—Howard W. Britton
*Attorney*—R. S. Sciascia et al.

[57] ABSTRACT

A system of coded discs and mirrors is used with a black and white television system to obtain a colored stereo television picture. No prisms and only one cathode ray tube are used.

4 Claims, 6 Drawing Figures

COLOR STEREO TELEVISION

BACKGROUND OF THE INVENTION

1. Field of the Invention

This invention relates to stereo television systems. More particularly, this invention relates to television systems in which the viewer receives a three dimensional effect through paraphernalia worn on the head or held before the eyes.

2. Description of the Prior Art

In certain occupations it is often desirable to handle materials or tools from a remote location with mechanical hands. For example, it is often desirable to handle explosives with remotely operated mechanical hands. One way of enabling a person to work remotely is to provide a television system to permit remote viewing of the materials being worked on.

Conventional two dimensional television systems, while they are widely employed in occupations such as explosives handling, are not ideal because it is often extremely difficult to manipulate materials without a sense of depth. As an improvement, stereo or three dimensional television systems, both black and white and colored, have been devised.

The most pertinent prior art black and white stereo television systems utilize lenses and prisms to alternately direct light along two separated paths to a light responsive electrode in a camera tube. Electrical image signals produced when the light strikes the electrode are then transmitted to a pair of remotely located cathode ray tubes which convert the electrical signals back into light. A viewing hood which contains two ocular devices and the two cathode ray tubes is worn on the head of a user to view the image in stereo. This particular type of prior art black and white stereo television system has two major drawbacks. Firstly, it utilizes prisms. Secondly, two cathode ray tubes are used to permit stereo viewing. Most other prior art stereo television systems used two cameras and two transmission lines as well.

When a prism is utilized to deflect light, a large amount of the impinging light is lost (not deflected in the desired direction) either because it passes straight through the prism or because it is deflected in some other undesired direction. Also, prisms cause severe chromatic aberrations. Thus, prisms are not very efficient and are undesirable for use in stereo television systems.

Since the viewer of a three dimensional television ordinarily wears the receiving means (cathode ray tubes) on his head by virtue of their being incorporated into the viewing hood, the use of two cathode ray tubes is undesirable because of the weight involved.

A typical prior art color stereo television system is similar to a black and white one except that more sophisticated equipment is used. One piece of more sophisticated equipment, namely, a camera adapted for producing color, is a very expensive and complicated piece of equipment. Most commercial color cameras utilize four sensor tubes. Thus, colored stereo television systems are priced in a range which is prohibilitvely high to permit their use by many small businesses.

SUMMARY OF THE INVENTION

This invention provides a color stereo television system which utilizes mirrors in lieu of prisms, only one cathode ray tube in lieu of two and a black and white television camera in lieu of a color television camera.

Light from the object being televised is directed along two slightly separated paths to the light responsive electrode in a black and white camera tube by means of a system of lenses and mirrors coupled with a color coded disc. The light responsive electrode produces video signals which are transmitted to a single cathode ray tube. This tube employs them to produce optical light images which are, in turn, transmitted through a transfer lens to another arrangement of devices which includes mirrors and a color coded disc. This second arrangement of devices directs the images sequentially to left and right oculars where they are viewed in stereo and in color.

DESCRIPTION OF THE PREFERRED EMBODIMENT

Figure 1:
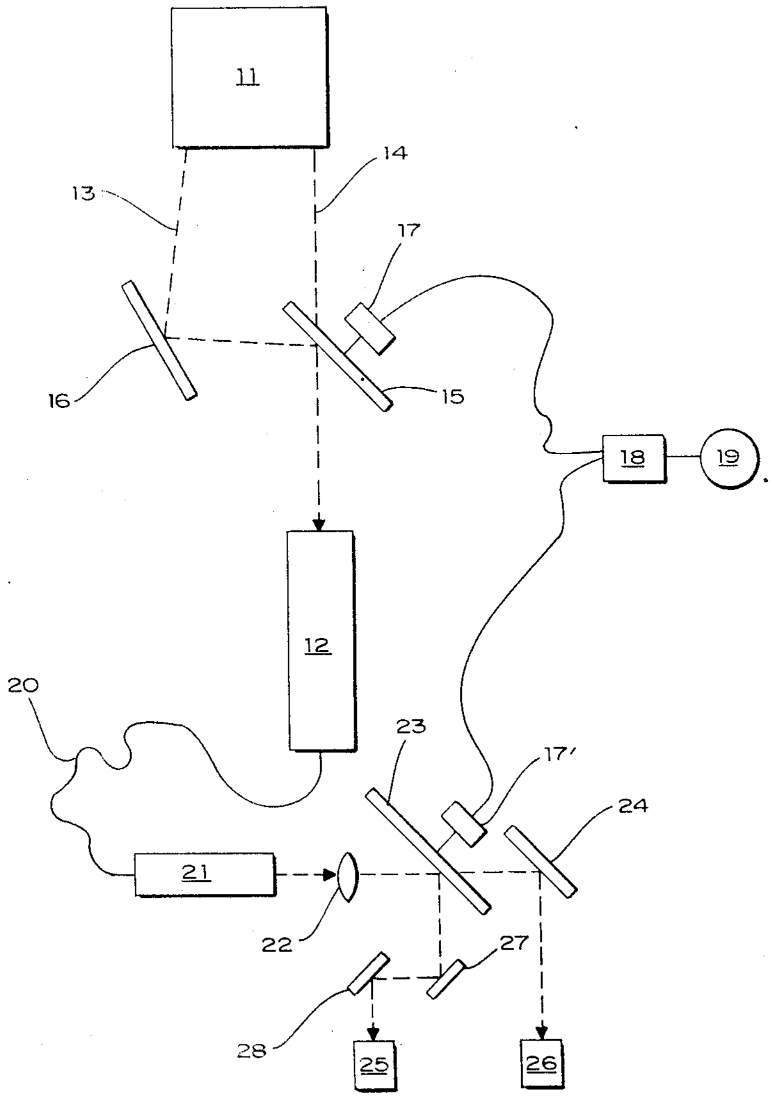
FIG. 1 is a schematic view of a black and white stereo television system according to this invention.

Going first to the drawing in which a black and white stereo television system and paraphernalia for turning the black and white system into a colored one are depicted, FIG. 1 is a schematic view of a black and white stereo television system according to this invention. A black and white system rather than a complete color system is depicted in FIG. 1 in order to simplify the description.

In a black and white stereo television system as shown in FIG. 1, light emanating from an object 11 being televised in stereo is caused to enter a camera tube 12 in alternate time increments after having passed along two slightly separated paths 13, 14. A coded disc 15 and mirror 16 arrangement is utilized to permit the alternate increments of light to enter camera tube 12. The coded disc in a black and white system is actually a disc, one half of which is silvered and one half of which is clear glass, and which is rotated by means of a synchro receiver 17 — synchro transmitter 18 — variable speed motor 19 combination or other suitable means. When light traveling along path 14 strikes clear glass it passes through and into camera tube 12 and, at the same time, light passing along path 13 is not reflected into the camera tube but passes through the glass into space. On the other hand, when coded disc 15 has rotated so that light passing along path 14 strikes silvered glass, that light is reflected and does not enter camera tube 12 but light passing along path 13 is reflected into camera tube 12.

After being received by a light responsive electrode in camera tube 12, light is converted into electrical image signals and these signals are transmitted via transmission line 20 to a cathode ray tube 21 where it is converted back into an optical image of object 11.

From cathode ray tube 21, the image is transferred via a transfer lens 22 through another coded disc 23 — mirror 24 arrangement to oculars 25, 26. Half of coded disc 23, like coded disc 15, is silvered and half is clear. Also, like coded disc 15, coded disc 23 is rotated by a synchro receiver 17′ — synchro transmitter 18 — variable speed motor 19 combination. The discs are synchronized in a manner which causes the images obtained from path 13 to enter ocular 25 and the images obtained from path 14 to enter ocular 26 for three dimensional viewing.

Mirrors 27 and 28 are utilized to insure that the two paths that the images take are equal in length. For inter-ocular adjustment, mirror 28 is mounted in a manner which causes it to move with ocular 25 while mirror 27 and coded disc 23 are mounted in a manner which causes them to move half the distance that mirror 28 and ocular 25 move. Thus, a proper focus is maintained.

Figure 2:
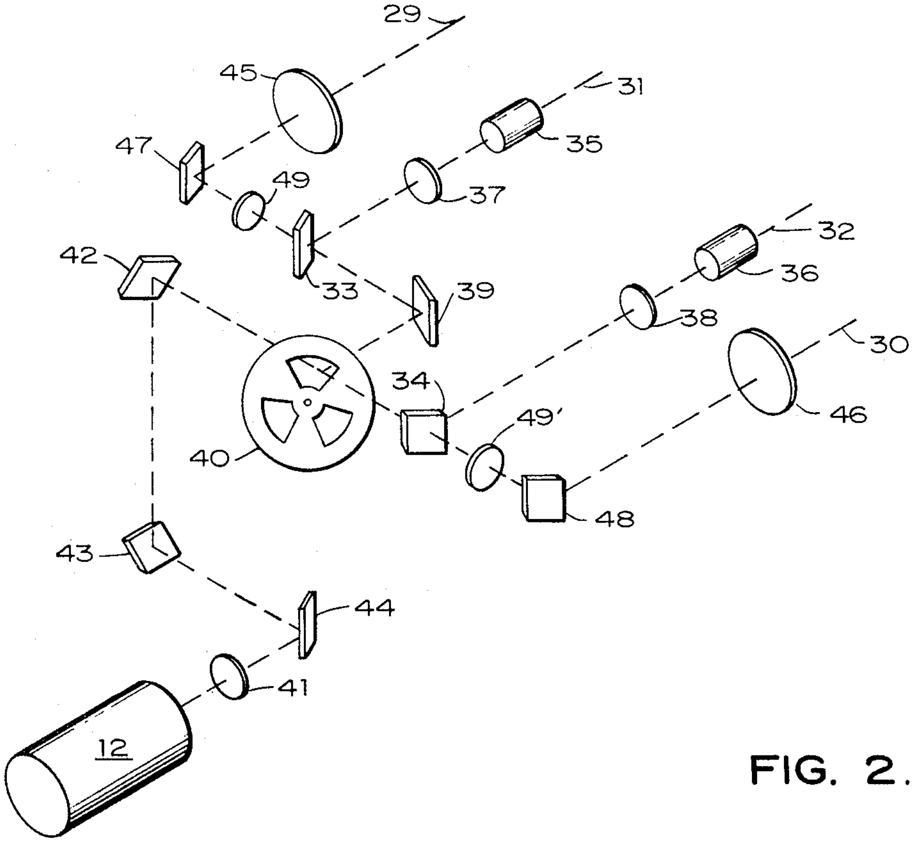
FIG. 2 is a schematic view of a system of lenses and mirrors coupled with a color coded disc for use in front of the camera in a colored stereo television system according to this invention.

FIG. 2 depicts a system of lenses and mirrors and a color coded disc which is used in front of the camera tube in the preferred (color) embodiment of this invention. Examination of the FIG. will reveal that light may be caused to travel along either of two pairs (29, 30 or 31, 32) of separated paths into camera tube 12 depending upon whether or not mirrors 33, 34 are in the system. Lenses 35 and 36 are chosen to provide a 1X magnification while lenses 45 and 46 provide a 4X magnification. Thus, by constructing the system in a manner which permits mirrors 33, 34 to be inserted into it or removed from it at will, the system can be made to magnify the object being televised or show it in natural size, whichever is desired. That is, when paths 31 and 32 are used, mirrors 33 and 34 present a first surface reflection and light traveling along paths 29 and 30 will be reflected and prevented from entering camera tube 12. If, on the other hand, mirrors 33 and 34 are removed from the system, light entering camera tube 12 will come from paths 29 and 30 because light from paths 31 and 32 will never strike a mirror. If light entering camera tube 12 comes from paths 31, 32, which are preferably about 2½ inches apart, the image produced will have natural convergence for stereo viewing. If light entering camera tube 12 comes from paths 29, 30 which are preferably about 10 inches apart, the image will be magnified approximately four times over the size obtained from paths 31, 32 but will still provide the same apparent convergence and proper stereo viewing. It is noteworthy that this embodiment now permits useful stereo viewing to 120 feet rather than the nominal human limit of 30 feet.

From FIG. 2 it can be seen that if mirror 33 is in the system, light traveling along path 31 will pass through lenses 35 and 37, be deflected by mirror 33 to mirror 39 and be deflected by mirror 39 to color coded disc 40. Whether or not the light is deflected by color coded disc 40 to mirror 42, mirror 43, mirror 44, lens 41 and camera 12 depends on the position in rotation of the color coded disc 40.

The color coded disc 40 (depicted in detail in FIGS. 5 and 6) preferably contains three colors and is designed to be one half reflecting and one half transmitting. For light passing along path 31 (or 29) it is mounted at an angle and rotated at a speed such that one half the time it will reflect light to mirror 42 and onward and the other one half the time light will be transmitted through it into space. Disc 40 may be rotated by a synchro-receiver — synchro transmitter-variable speed motor means (not shown in FIG. 2) which is shown in FIG. 1. It has been determined experimentally that at least eight pairs of pictures (eight left and eight right) per second are required for a human to perceive the images in stereo.

If mirror 34 is in the system, light passing along path 32 will travel through lenses 36 and 38 and be deflected by mirror 34 to color coded disc 40 where it will either be deflected away from or allowed to pass on to mirror 42, mirror 43, mirror 44, lens 41 and camera tube 12 depending upon the position in rotation of the color coded disc 40. Thus, for the pair of paths 31 and 32, one half of the time light entering camera tube 12 comes from path 31 and the other one half of the time it comes from path 32.

As shown in the drawing, if mirrors 33 and 34 are removed, light passing along path 29 will travel through lens 45, deflect from mirror 47 and travel through lens 49 after which time it will follow a path similar to that depicted for path 31. In a like manner, light traveling along path 30 will pass through lens 46 and be deflected by mirror 48 through lens 49′ into a path common with that described for path 32.

Figure 3:
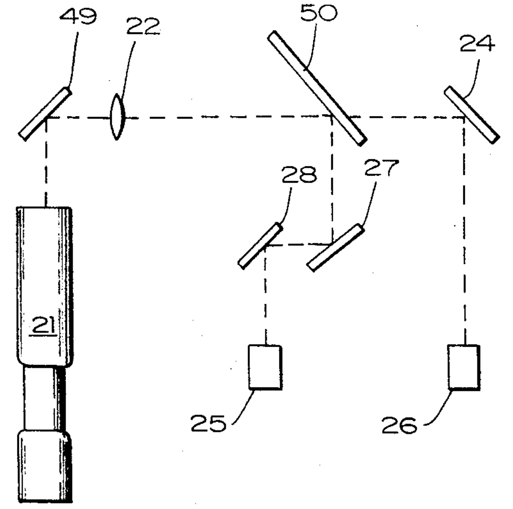
FIG. 3 is a schematic view of a system of lenses and mirrors coupled with a color coded disc for use behind the cathode ray tube in a colored stereo television system according to this invention.
Figure 5:
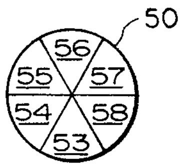
FIG. 5 is an elevational view of a color coded disc of the type depicted in FIGS. 2 and 3.

FIG. 3 depicts the arrangement of apparatus in the viewing hood of a preferred color stereo television system according to this invention. Light, after traveling through the apparatus depicted in FIG. 2, being converted to image signals in the camera tube, and traveling through a transmission line (FIG. 1) to cathode ray tube 21 is converted back into sequential images by the cathode ray tube. These images come out of the cathode ray tube sequenced by the color coded disc 40 shown in FIG. 2. The cathode ray tube will sequentially display the left (path 31 or 29) and right (path 32 or 30) camera lens views. The light, after emerging from the cathode ray tube is deflected by mirror 49 through lens 22 and strikes a color coded disc 50. The color coded disc 50 is similar to the color coded disc 40 shown in FIG. 2 and is synchronized with color coded disc 40 in a manner whereby it reflects light received from path 31 or 29 (whichever the case may be) to mirrors 27 and 28 and ocular 25 and allows light from path 32 or 30 (whichever the case may be) to pass on to mirror 24 and, from thence, to ocular 26. Synchronization may be accomplished by means of an arrangement of synchro receivers, synchro transmitters, and a variable speed motor as shown in FIG. 1. Color coded disc 50 is also synchronized with color coded disc 40 in a manner whereby light which contacted any particular color on disc 40 contacts the same color on disc 50. There are six separate and distinct images on the camera for each rotation of the color coded disc 40. Sequentially they may be either (1) left eye red, left eye blue, left eye green, right eye red, right eye blue, and right eye green or (2) left eye red, right eye red, left eye blue, right eye blue, left eye green, and right eye green with (1) being preferred. (This, assuming red, blue and green are the three colors used in the disc and that the disc is constructed as shown in FIG. 5.) After projection through the color coded disc 50 in the display system, each of these six images is seen by the eye as if that particular eye looked at the original scene through a colored filter. However, since the separate images are sequenced at a fast rate, the eye perceives a balanced color picture of the scene. Color rendition is good without any adjustments.

In one embodiment, both color coded discs (40 and 50) are rotated at 600 rpm in order to synchronize each of the six images per rotation with the vertical sync pulses of the television composite video signal. When this is done the color coded discs need not be driven with the synchro receiver-synchro transmitter-variable speed motor combination described above but, instead, may be driven by a stepper or other motor with appropriate drive electronics permitting true remote operation.

Figure 4:
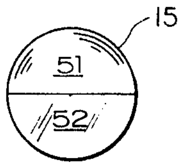
FIG. 4 is an elevational view of a coded disc depicted in FIG. 1.

FIG. 4 is an elevational view of what is herein referred to as a coded disc. The disc, which is of the type depicted in FIG. 1 (disc 15 or disc 23), is divided into a silvered half 51 and a clear glass half 52. Light striking the silvered half 51 will be reflected and light striking the clear glass half 52 will pass through unobstructed.

FIG. 5 is an elevational view of a preferred color coded disc. The disc is divided into six equal sized sections 53, 54, 55, 56, 57 and 58. In a preferred red, blue and green disc one section, for example, section 53, is red reflecting (left eye red), the next (section 54) blue reflecting (left eye blue), the next (section 55) green reflecting (left eye green), the next (section 56) red transmitting (right eye red), the next (section 57) blue transmitting (right eye blue) and the next (section 58) green transmitting (right eye green).

For situation (2) above, i.e., left eye red, right eye red, etc., the disc would be constructed so that the six sections alternately transmitted and reflected light. That is, if section 53 were red reflecting section 54 would be red transmitting and so on.

Figure 6:
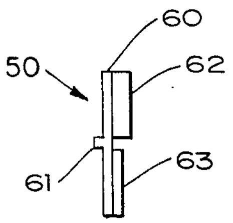
FIG. 6 is a cross sectional view of a color coded disc of the type depicted in FIG. 5.

FIG. 6 is a cross sectional view of a color coded disc of the type depicted in FIG. 5. The disc has a base 60 of glass (or other suitable material such as plastic) and a mounting projection 61 which may or may not be necessary depending on how the disc is mounted. One half of the base is silvered so that it will reflect light and that half is covered with a sheet of red, blue and green (or any other suitably colored) material 63 which may be tinted glass or any other suitable material. The other half of the base is not silvered, i.e., the other half of the base is light transmitting, and is covered with a sheet of red, blue and green (or other suitably colored) material 62. Sheet 62 has a thickness which is twice that of sheet 63. This is to cause light to pass through equal thicknesses of colored material. That is, if the thickness of sheet 63 is considered to be 1 then that of sheet 62 will be 2 and reflected light will pass through 1 thickness of sheet 63, strike base 60 and be reflected back out through sheet 63 for a total of two thicknesses of colored material while, on the other hand, light passing through sheet 62 will pass through two thickness of colored material and then be transmitted on through base 60 which is non-colored for a total of two thicknesses of colored material.

In practicing this invention, any mounting methods, types of housing, servomechanisms, etc. consistent with the objects of the invention may be used. Almost any black and white camera may be used. However, those with plumbicon tubes are preferred.

I claim:

1. A color stereo television system comprising:

a. means for sequentially directing light images from a left eye path and a right eye path to a black and white television camera, said means comprising a plurality of lenses and mirrors which direct the images from the two said paths to a first rotating color coded disc which, in turn, sequentially directs them to the camera;

b. means for sequentially transmitting video signals produced by the television camera in response to the light images to a single cathode ray tube which converts said video signals back into light images and sequentially transmits them to a transfer lens mounted in front of it;

c. means comprising a second rotating color coded disc and mirrors for receiving the light images from said transfer lens and sequentially directing them, in the proper order, to a pair of left and right eye oculars for viewing;

d. means for causing said first color coded disc and said second color coded disc to rotate in a synchronization which causes said left eye ocular to receive the light images arising from said left eye path and the right eye ocular to receive the light images arising from said right eye path; and e. the distance between said left eye path and said right eye path can be widened by removing two mirrors from the system and the light images received by the camera from said paths is caused to be magnified by a pair of 4X magnification lenses in said paths.

2. A color stereo television system according to claim 1 wherein said first rotating color coded disc and said second rotating color coded disc are rotated at a speed of 600 rpm.

3. A color stereo television system according to claim 1 wherein said color coded discs are constructed to be one half light transmitting and one half light reflecting with each half being divided equally into three different colors.

4. A color stereo television system according to claim 3 wherein said half light transmitting and half light reflecting color coded disc is constructed so that light must pass through equal thicknesses of coloring material whether it is transmitted or reflected.

* * * * *